US012613755B2

(12) United States Patent
Wang

(10) Patent No.: US 12,613,755 B2
(45) Date of Patent: Apr. 28, 2026

(54) REPLICATED TIME WHEEL DELAY EVENT SCHEDULING

(71) Applicant: eBay Inc., San Jose, CA (US)

(72) Inventor: Xiaoye Wang, Shanghai (CN)

(73) Assignee: eBay Inc., San Jose, CA (US)

( * ) Notice: Subject to any disclaimer, the term of this patent is extended or adjusted under 35 U.S.C. 154(b) by 473 days.

(21) Appl. No.: 18/365,806

(22) Filed: Aug. 4, 2023

(65) Prior Publication Data

US 2025/0045130 A1 Feb. 6, 2025

(51) Int. Cl.
*G06F 9/54* (2006.01)
*G06F 1/06* (2006.01)

(52) U.S. Cl.
CPC .............. *G06F 9/542* (2013.01); *G06F 1/06* (2013.01)

(58) Field of Classification Search
CPC .......... G06F 9/542; G06F 1/06; G06F 9/4881
See application file for complete search history.

(56) References Cited

U.S. PATENT DOCUMENTS

| | | | | |
|---|---|---|---|---|
| 9,229,774 | B1 * | 1/2016 | Wilkes ................... | G06F 9/5027 |
| 9,329,937 | B1 * | 5/2016 | Grant ................... | G06F 11/2025 |
| 11,256,717 | B2 | 2/2022 | Zheng et al. | |
| 11,985,263 | B1 * | 5/2024 | Liu ....................... | H04L 9/3239 |
| 2013/0067484 | A1 * | 3/2013 | Sonoda ................. | G06F 9/5038 |
| | | | | 718/103 |
| 2014/0281022 | A1 | 9/2014 | Arramreddy et al. | |

| | | | | |
|---|---|---|---|---|
| 2016/0292334 | A1 * | 10/2016 | Rabinovitch ......... | G06F 30/331 |
| 2020/0111092 | A1 | 4/2020 | Wood et al. | |
| 2021/0303410 | A1 * | 9/2021 | Lei ......................... | G06F 3/0619 |
| 2022/0035666 | A1 * | 2/2022 | Wang ................. | G06F 13/1668 |

(Continued)

FOREIGN PATENT DOCUMENTS

| | | | |
|---|---|---|---|
| CN | 113326074 | B | 4/2022 |
| CN | 114296902 | A * | 4/2022 |

(Continued)

OTHER PUBLICATIONS

Chiou, Derek , et al., "Scheduler-Based prefetching for Multilevel Memories", Computer Science and Artificial Intelligence Laboratory [retrieved May 1, 2023]. Retrieved from the Internet <http:// csg.csail.mit.edu/pubs/memos/Memo-444/memo-444.pdf>., Jul. 2001, 26 Pages.

(Continued)

*Primary Examiner* — Dong U Kim
(74) *Attorney, Agent, or Firm* — FIG. 1 Patents

(57) ABSTRACT

A delay event system is described that maintains a main copy of a time wheel, which includes a plurality of slots that each correspond to a different time. The main copy of the time wheel is maintained at a first node, and a plurality of replica copies of the time wheel are maintained at different nodes. Events scheduled for future execution are placed into an appropriate time wheel slot and propagated to the replica copies. Each time wheel one of the slots in the main copy of the time wheel. Upon writing a delay event to the main copy of the time wheel, event replicas are propagated to each of the replica copies of the time wheel, such that each copy of the time wheel include the same information for the delay event. The time wheels are advanced synchronously and used to trigger events at their designated time(s).

20 Claims, 7 Drawing Sheets

(56) References Cited

U.S. PATENT DOCUMENTS

| | | | |
|---|---|---|---|
| 2022/0245202 A1 | 8/2022 | Chaudhry et al. | |
| 2022/0400150 A1 | 12/2022 | Bade | |
| 2023/0289217 A1* | 9/2023 | Liljedahl | G06F 9/30087 |
| 2023/0376339 A1* | 11/2023 | Athalye | G06F 9/4887 |

FOREIGN PATENT DOCUMENTS

| | | | | |
|---|---|---|---|---|
| CN | 114741179 A | 7/2022 | | |
| CN | 114968615 A * | 8/2022 | | G06F 9/546 |
| CN | 115237612 A | 10/2022 | | |

OTHER PUBLICATIONS

Montondo, Meriah , et al., "bigben", GitHub, Inc., Uploaded by mmonto7 [retrieved May 1, 2023]. Retrieved from the Internet <https://github.com/walmartlabs/bigben>., 2018, 13 Pages.

* cited by examiner

200

Event Schedule Request
110

Delay Event System 104

Hashing Module 114

Hashing Function 202

Delay Event 204 → Memory 108 / Time Wheel 106

Parameters 206

Event Log 208

Delay Event 204

Parameters 206

Consensus Module 118

Consensus Protocol 210

Event Replica 128 → Node 120 / Memory 124 / Time Wheel Replica 122

Commit Message 130

Driver Module 116

Current Pointer 212

Advance 214 → Memory 108 / Time Wheel 106

Event 132

Event Flush 216

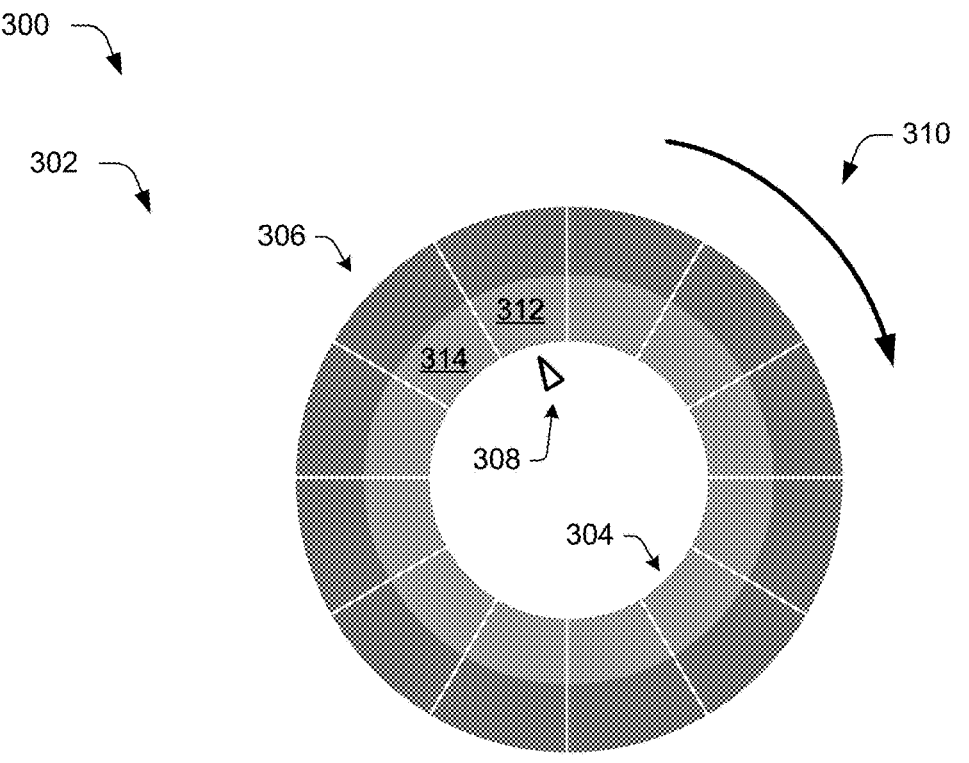
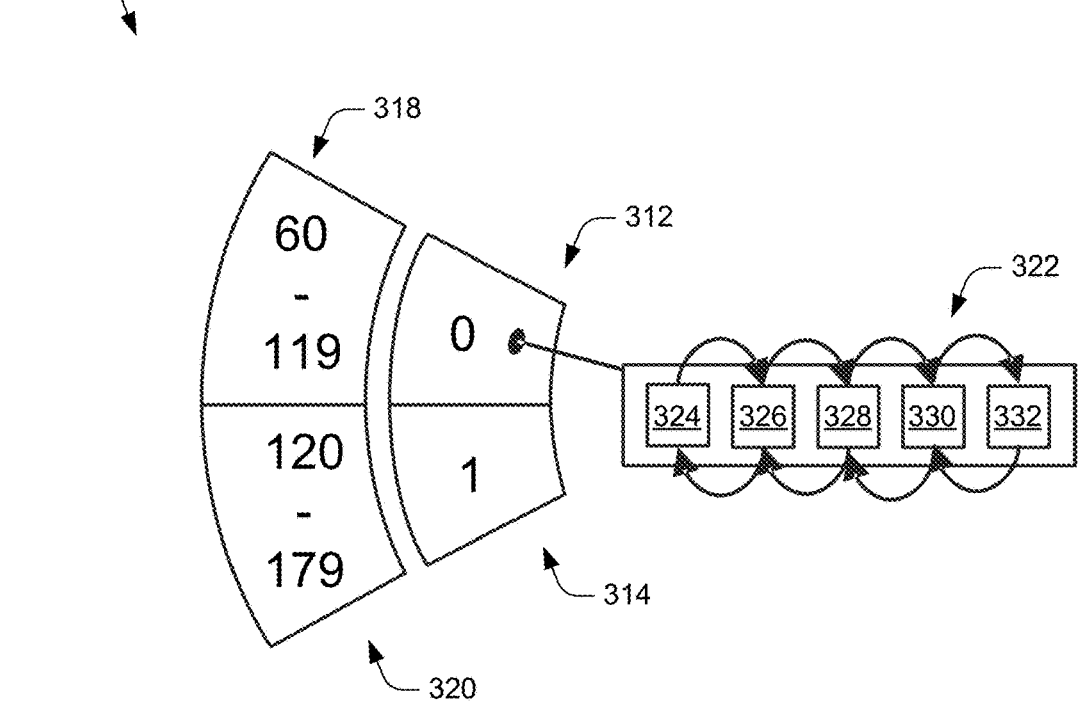
*Fig. 3*

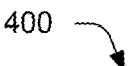

400

402
Receive a request to schedule an event to be triggered at a future time

404
Place the event into an appropriate slot of a main copy of a time wheel

406
Propagate the event to each of a plurality of replica copies of the time wheel 408
Commit message from each of the plurality of replica copies?

YES

NO

410
Confirm scheduling of the event

412
Automatically retry propagating the event to a replica copy

414
Indicate event scheduling fail

Fig. 4

600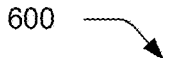

```
                              ┌──────────────┐
                  NO         ╱    602         ╲        YES
                  ┌─────────╱ Main copy of     ╲─────────┐
                  │         ╲ time wheel        ╱        │
                  │          ╲   down?         ╱         │
                  │           ╲───────────────╱          │
                  │                                      │
                  ▼                                      │
        ┌──────────────────────────────────┐            │
        │            604                    │            │
        │  Initiate execution of delay      │            │
        │  events recorded in the time      │            │
        │  wheel using the main copy of     │            │
        │  the time wheel                   │            │
        └──────────────────────────────────┘            │
                          │                              │
                          └──────────────┬───────────────┘
                                         │
                                         ▼
        ┌──────────────────────────────────────────────┐
        │                  606                          │
        │     Elect one of a plurality of replica       │
        │     copies as a new main copy of the          │
        │     time wheel                                │
        └──────────────────────────────────────────────┘
                                  │
                                  ▼
        ┌──────────────────────────────────────────────┐
        │                  608                          │
        │  Initiate execution of the delay events       │
        │  recorded in the time wheel using the         │
        │  new main copy of the time wheel              │
        └──────────────────────────────────────────────┘
```

Platform 716

Resources 718

Cloud
714

Computing Device 702

Processing
System 704

Hardware
Elements 710

Computer-readable
Media 706

Memory/
Storage 712

I/O
Interfaces 708

Delay Event
System 104

REPLICATED TIME WHEEL DELAY EVENT SCHEDULING

BACKGROUND

With advances in computing device technology, computing devices are increasingly used to perform a variety of computational tasks. Performing each computational task at an appropriate time is often imperative in achieving an objective associated with the computational task. As a corollary, scheduling this increasing number of computational tasks for performance at the appropriate times in the future is also increasingly difficult, particularly as computing systems and applications continue to scale in size and complexity. Due to the requisite precision associated with performing scheduled computational tasks (e.g., executing a computational task at a designated time in the future), conventional systems often limit a number of computational tasks that can be scheduled for future execution, limit a duration into the future at which computational tasks can be scheduled, or a combination thereof.

SUMMARY

Systems and methods are described for maintaining a main copy of a time wheel at a first node, where the time wheel includes a plurality of slots that each correspond to a different point in time. In addition to the main copy of the time wheel at the first node, a plurality of replica copies of the time wheel are maintained in memory of a plurality of different nodes. Events that are requested to be scheduled in the future are hashed into an appropriate one of the slots in the main copy of the time wheel. Upon writing a delay event to the main copy of the time wheel, event replicas are propagated to each of the replica copies of the time wheel, such that each copy of the time wheel include the same information for the delay event. The time wheel copies (e.g., the main copy and each replica copy) are advanced synchronously in time.

While advancing each time wheel, slots of the main time wheel are evaluated relative to a current pointer that represents a current point in time to determine whether any delay events are scheduled to be executed at the current time. In response to detecting that a time wheel slot indicates that a previously delayed event is scheduled to occur, execution of the event is triggered. To safeguard against potential system failures, in the event that the main copy of the time wheel fails, a consensus protocol is implemented to elect one of the replica copies to serve as the new main copy of the time wheel, thus ensuring that delay events continue to be scheduled and executed with precision, even in the event of one or more node failures.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In some implementations, entities represented in the figures are indicative of one or more entities and thus reference is made interchangeably to single or plural forms of the entities in the discussion.

FIG. 3 depicts an example showing an example structure of a time wheel utilized by the delay event system of FIG. 1.

FIG. 4 is a flow diagram depicting a procedure in an example implementation in which a delay event system schedules a delay event at a main copy of a time wheel and at a plurality of replica copies of the time wheel.

FIG. 6 is a flow diagram depicting a procedure in an example implementation in which a delay event system elects a time wheel replica as a new main copy in response to detecting a failure of an original main copy of the time wheel.

DETAILED DESCRIPTION

Overview

Figure 1:
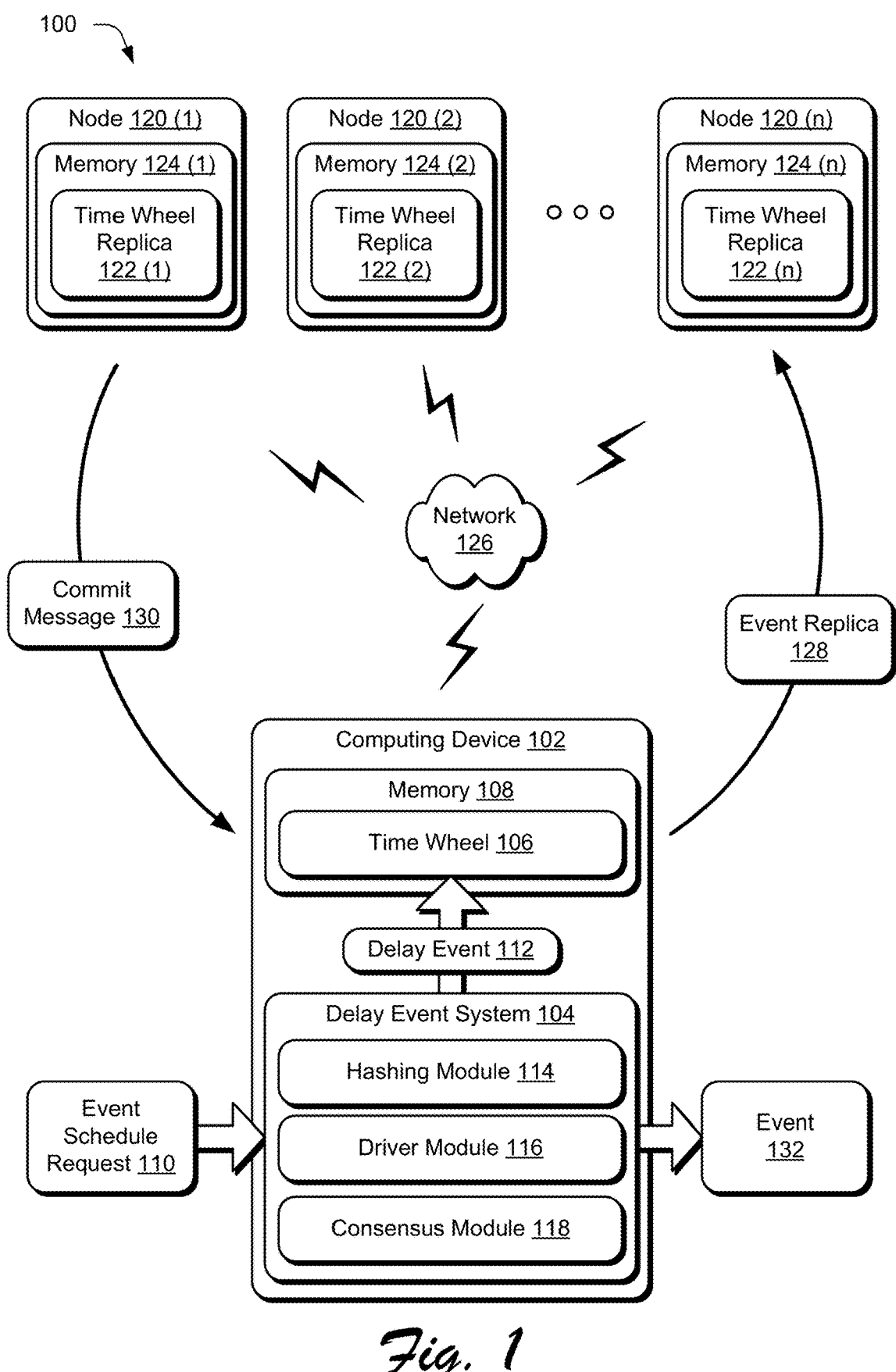
FIG. 1 is an illustration of an environment in an example implementation that is operable to employ a delay event system to schedule and execute delay events using a plurality of time wheels that are each maintained in memory of a different node.

Increasing amounts of computing applications, system services, and so forth involve scheduling events (e.g., one or more computational tasks) that are to be to be triggered (e.g., performed or executed) at a designated time in the future. As described herein, these events scheduled for future performance are referred to as "delay events." Delay events are utilized to achieve a wide range of objectives. For instance, many digital calendar applications offer push notification functionality to alert a user regarding an upcoming event (e.g., "Henry's birthday is tomorrow" or "you have a dentist appointment in 30 minutes"). Scheduling such notifications to be issued at a future time is one common example of delay event scheduling. Delay event scheduling is also used for a range of computational tasks in addition to notifications. For instance, home automation services offer delay event scheduling to automate tasks (e.g., turn the lights on at 8:00 PM, set the heat to 70 degrees at 4:00 PM, and so forth).

In addition to scheduling user-facing functionality, delay events are frequently used to coordinate back-end computing system functionality. For instance, database maintenance involves operations such as backup procedures, indexing, and clean-up, which are commonly scheduled for performance during off-peak hours to minimize service disruptions. Software updates also commonly involve scheduling system updates to be run at a time when the system is least likely to be in use or otherwise disrupted by the update process. In this manner, delay event scheduling has a wide range of applicability in computational task performance and enables optimization of computational resource usage, minimizing system wait times, even task distribution, and ensuring that computational tasks are performed with precision (e.g., events occur when they are scheduled to do so).

With the increasing number of delay events that are scheduled by computing systems, applications executing on the computing systems, and so forth, conventional systems are unable to scale to accommodate handling this increasing amount of data associated with delay event scheduling. As a consequence, conventional systems often limit an amount of delay events that can be scheduled, limit a duration into the future by which delay events can be scheduled, or limit a combination thereof.

Scheduling such a high volume of delay events is challenging, particularly as computing system and applications continue to scale in size and complexity. Some conventional approaches for scheduling delay events involve using a time wheel data structure to maintain future events in different slots, where each slot corresponds to a future point in time. To minimize delay associated with retrieving a delay event from the time wheel data structure and executing the delay event, such conventional time wheel data structures are maintained in memory. However, computing device memory is highly susceptible to failure (e.g., in the event of an application or system crash, data maintained in memory associated with the application or system is wiped out). Consequently, conventional systems that implement time wheel data structures in memory fail to perform scheduled delay events with requisite precision for an associated computational task or objective, as memory failure renders it impossible to execute scheduled delay events during a system failure until the time wheel data structure is recreated. Such failures render conventional delay event scheduling systems inoperable for their intended purpose, as memory failure makes it impossible to execute or otherwise perform events that were otherwise scheduled to occur.

To address these conventional shortcomings, a delay event system is described. The delay event system is configured to schedule delay events for performance at future times for a range of different computational systems, applications, objectives, combinations thereof, and so forth. To do so, the delay event system maintains a time wheel data structure in memory of a computing device with information describing one or more parameters for each of the delay events (e.g., timing information for triggering initiation of each delay event, a retry interval for a delay event, one or more actions to be performed as part of executing the delay event such as code to execute upon triggering of the delay event, and so forth). To address the shortcomings facing conventional systems as noted above, the delay event system is configured to maintain replica copies of the time wheel data structure in memory of different nodes in a distributed computing environment. As described herein, each time wheel data structure (e.g., a main copy of a time wheel and each of its replica copies) refers to a type of data structure organized around computing memory addresses. A time wheel data structure includes a plurality of "slots," where each slot corresponds to a specific range of addresses in computing memory. The slots of a time wheel are interconnected in a circular or ring formation, thus creating a cyclical structure. The data structure is thus operable in a circular fashion, where a process moves from one slot to the next in a defined sequence (e.g., when the process reaches the end of the last time wheel slot, it returns to the beginning of the first time wheel slot, thus forming a continuous loop or cycle). Each time wheel slot is configured to hold data related to the corresponding memory addresses, such that when a process arrives at a slot, operations on data or tasks stored within the slot are executed at an appropriate time.

By maintaining replica copies of a time wheel data structure, even in an event of system failure that renders a main copy of a time wheel unable to initiate performance of delay events with requisite precision (e.g., unable to execute delay events at their scheduled time(s)), the distributed time wheel replicas ensure that delay events are executed at scheduled times. In implementations, a number of replica copies of a time wheel is defined by a replication factor, which is configurable to specify any integer of replica copies in a manner that promotes system optimization. For instance, additional replica copies of a time wheel reduce a likelihood of failing to execute a delay event as intended (e.g., additional replica copies ensure performance of the delay event as intended even when facing simultaneous failure of multiple nodes). Conversely, maintaining additional replica copies of a time wheel incurs additional computational overhead, as each time wheel replica requires storage space in memory to maintain and computational resources for update propagation.

The delay event system is implemented by a computing device and a main copy of a time wheel data structure that contains scheduled delay events, and their associated parameters, is maintained in memory of the computing device. The delay event system includes a hashing module that is configured to determine an appropriate placement for a delay event within the main copy of the time wheel. For instance, each time wheel (e.g., the main copy and each replica) is configured as including a plurality of slots, where each slot corresponds to at least one different system clock cycle of the computing device implementing the delay event system. As a specific example, in a configuration where a time wheel includes 60 slots and permits event scheduling on a per-second precision basis, each slot corresponds to a second of time. Via ongoing rotation of the time wheel, in this specific example a slot that corresponds to one second in the future also corresponds to 61 seconds in the future, 121 seconds in the future, and so forth.

In some implementations, each slot of a time wheel is configured as a doubly linked list of delay events, such that the delay events assigned to a given time wheel slot can be efficiently traversed (e.g., both forwards and backwards) to identify which delay events included in the given time wheel slot, if any, should be triggered for execution at a given instance. For instance, continuing the example above where a time wheel includes 60 slots that each represent a second of time, a full revolution of the time wheel occurs every minute. A delay event included in a given slot of this example time wheel can be scheduled with parameters indicating that a certain number of passes (e.g., a certain number of time wheel revolutions) should occur before the delay event is triggered for execution. For instance, if a delay event is scheduled to happen five minutes into the future, the delay event is hashed into an appropriate region of the time wheel that causes a time wheel driver to ignore the delay event (e.g., not trigger execution of the delay event) during the first four revolutions of the time wheel after the delay event is hashed into the corresponding slot.

In this manner, each time wheel slot is configured to store information for any number of delay events that are scheduled to be triggered at a time in the future that corresponds to the time wheel slot. The hashing module of the delay event system is configured to identify the appropriate time wheel slot that corresponds to a designated time in the future at which a delay event is scheduled to be triggered. For instance, in another example scenario where each time wheel slot corresponds to a system clock cycle, the hashing module is configured to identify a position of the time wheel relative to a current pointer, calculate a number of clock cycles that will occur between a current time and the designated time in the future at which the delay event is to be triggered, and determine an appropriate slot in the time wheel that will be positioned at the current pointer during the designated time in the future. The hashing module then updates the time wheel to include information describing the delay event and its associated parameters in the appropriate slot.

In some implementations, the main time wheel and each replica copy are configured as hierarchical data structures, where different layers or levels of a time wheel are used to schedule events (e.g., such that outer layers are used to store events that are scheduled for execution further in the future while inner layers are used to store events that are scheduled for execution in the near future). In some implementations, to reduce an amount of data occupied in memory by a time wheel, the hashing module is configured to write delay events that are schedule for execution far in the future (e.g., more than a threshold duration from a current time) in disk storage (e.g., rather than memory) and push the delay event from disk storage to memory (e.g., in an appropriate slot of the time wheel) when the delay event is no longer scheduled to be executed beyond the threshold duration from a current time.

The delay event system additionally includes a consensus module, which is responsible for propagating information describing an event that has been hashed into a slot of the main time wheel to each of a plurality of replica copies of the time wheel that are maintained in memory of distributed nodes. The consensus module thus ensures that updates made to the main copy of the time wheel (e.g., addition or removal of delay events) are propagated to replica copies of the time wheel that are each maintained in memory of a different node (e.g., a different computing device) communicatively coupled to the computing device that maintains the main copy of the time wheel. In this manner, the consensus module ensures that all versions of a time wheel (e.g., the main time wheel and each of its replicas) include the same information regarding scheduled delay events.

To do so, the consensus module leverages a consensus protocol that is also implemented at each of the plurality of nodes storing replica copies of the main time wheel. In the event of failure of the main copy of the time wheel, the consensus protocol elects one of the replica copies to serve as the new main copy of the time wheel, thus ensuring that scheduled delay events continue to be executed with precision (e.g., at times when the events are supposed to occur and without delay). When propagating event updates from a main copy of a time wheel to its replicas, the consensus module tasks each node maintaining a replica copy of the time wheel with returning a commit message that serves a confirmation of the event update having been successfully propagated to (e.g., added to or removed from) the replica of the time wheel. In implementations where a replica node fails to return a commit message within a threshold amount of time, the consensus module is configured to automatically retry propagating the event update to the replica node. Alternatively or additionally, in implementations where a replica node fails to return a commit message, the consensus module is configured to remove the corresponding delay event from the main copy of the time wheel, as well as any replica copies from which commit messages were successfully received, thus ensuring that all versions of the time wheel remain consistent with one another. In such a scenario where a delay event is not successfully propagated to all versions of the time wheel, the consensus module is configured to notify a requesting entity (e.g., a computing device, process, or application from which the delay event scheduling request was received) that the delay event failed to schedule properly and needs to be re-requested.

The delay event system further includes a driver module, which is responsible for advancing rotation of the time wheel (e.g., advancing the time wheel relative to a "current" pointer by one slot every system clock tick, every fraction of a second, every second, or the like). The driver module is further responsible for scanning the corresponding region (e.g., the time wheel slot) at a given interval (e.g., every system clock tick) and initiating performance of one or more events that are scheduled for execution at the current time. After successfully triggering execution of a delay event, the driver module removes the corresponding delay event information from the main time wheel and causes the consensus module to remove the corresponding delay event information from each of the replica time wheels. In this manner, the delay event system and techniques described herein enable scheduling any number of delay events for any duration in the future and provide for redundancy in the event of node failure where one or more copies of a time wheel are lost, thereby avoiding the shortcomings facing conventional event scheduling systems.

In the following discussion, an example environment is described that is configured to employ the techniques described herein. Example procedures are also described that are configured for performance in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. As used herein, the term "digital medium environment" refers to the various computing devices and resources utilized to implement the techniques described herein. The digital medium environment 100 includes a computing device 102, which is configurable in a variety of manners.

The computing device 102, for instance, is configurable as a desktop computer, a laptop computer, a mobile device (e.g., assuming a handheld or wearable configuration such as a tablet or mobile phone), and so forth. Thus, the computing device 102 ranges from full resource devices with substantial memory and processor resources (e.g., personal computers, game consoles) to low-resource devices with limited memory and/or processing resources (e.g., mobile devices). Additionally, although described in the context of a single computing device 102, the computing device 102 is representative of a plurality of different devices, such as multiple servers utilized to perform operations "over the cloud."

In the illustrated example, the computing device 102 includes a delay event system 104. The delay event system 104 is representative of functionality of the computing device 102 to maintain a time wheel 106 in memory 108 of the computing device 102. The time wheel 106 is representative of a data structure maintained in memory 108 that is configured to store information regarding one or more delay events that are scheduled to occur (e.g., scheduled to be executed) at one or more future points in time. The memory 108 is representative of any suitable data storage location of the computing device 102, such as physical memory (e.g., DRAM, Flash memory, PCM, and so forth), a hard disk, a network card, a graphics card, a CXL device, a hardware accelerator, combinations thereof, and so forth.

For instance, the delay event system 104 is depicted as receiving an event schedule request 110, which is representative of a request from a source for the delay event system 104 to execute an event at a defined future time. In implementations, the event schedule request 110 is received from any one or more types of requesting sources. For instance, in an example implementation the delay event system 104 serves as a back-end system (e.g., a distributed back-end system) that provides event scheduling for a range of different computational systems, applications, services, combinations thereof, and so forth.

Upon receipt of the event schedule request 110, the delay event system 104 generates a delay event 112 and inserts the delay event 112 into a corresponding slot of the time wheel 106. The delay event 112 is representative of information describing one or more parameters for the event schedule request 110, such as a type of event to be performed, timing information for triggering initiation of the delay event 112, data describing one or more actions to be performed as part of carrying out the delay event (e.g., code to be executed as part of triggering the delay event), one or more callback (e.g., retry) intervals for continuing performance of the delay event until a satisfaction criteria for the delay event is achieved (e.g., information instructing a retry every one minute until user input acknowledges occurrence of the delay event), combinations thereof, and so forth.

To insert the delay event 112 into an appropriate corresponding slot of the time wheel 106, the delay event system 104 includes a hashing module 114. The hashing module 114 represents functionality of the delay event system 104 to determine an appropriate placement for the delay event 112 within the time wheel 106. For instance, in an example scenario where the time wheel 106 is configured as including a plurality of slots, each slot corresponds to at least one different point in time (e.g., at least one different system clock cycle of the computing device 102). As a specific example, in a configuration where the time wheel 106 includes 60 slots and is configured to schedule delay events up to a precision of one second, each slot of the time wheel 106 corresponds to a different second in time.

Via ongoing rotation of the time wheel 106, in this specific 60-slot example, a slot that corresponds to one second in the future also corresponds to 61 seconds in the future, 121 seconds in the future, and so forth. A specific granularity by which different slots of the time wheel 106 are segmented is not limited by the examples described herein, and the described techniques are extendable to generate a time wheel 106 with any suitable level of precision (e.g., a per-system-clock-cycle precision where each time wheel 106 slot corresponds to a different system clock cycle). Each slot of the time wheel 106 is configured as a doubly linked list of events, such that the delay event 112, when assigned to a slot of the time wheel 106 by the hashing module 114, is linked to one or more other delay events assigned to the same slot of the time wheel 106 in a doubly linked manner. Via such double linking, delay events assigned to a given time wheel slot can be efficiently traversed (e.g., both forwards and backwards) to identify which delay events included in the time wheel slot, if any, should be triggered for execution at a given instance.

For instance, continuing the example above where the time wheel 106 includes 60 slots that each represent a second of time, a full revolution of the time wheel 106 occurs every minute. When inserting the delay event 112 into the time wheel 106, the hashing module 114 is configured to do so by assigning parameters to the delay event 112, which indicate that a certain number of passes (e.g., a certain number of revolutions of the time wheel 106) should occur before the delay event 112 is triggered for execution. For instance, if the delay event 112 is scheduled to happen five minutes into the future, the delay event 112 is hashed into an appropriate region (e.g., slot) of the time wheel 106 that causes a driver module 116 of the delay event system 104 to ignore the delay event 112 (e.g., not trigger execution of the delay event 112) during the first four revolutions of the time wheel 106 after the delay event 112 is hashed into the corresponding slot.

The driver module 116 represents functionality of the delay event system 104 to advance rotation of the time wheel 106 (e.g., advance the time wheel 106 relative to a "current" pointer by one slot every system clock tick, every fraction of a second, every second, or the like). A frequency at which the driver module 116 advances the time wheel 106 is dependent on a duration of time represented by each slot of the time wheel 106. For instance, in implementations where each time wheel slot represents a different system clock cycle, the driver module 116 advances the time wheel one slot every system clock tick. As another example, in implementations where each time wheel slot represents a different minute, the driver module 116 advances the time wheel 106 one slot every 60 seconds.

Upon advancing the time wheel 106, the driver module 116 is configured to scan the corresponding region (e.g., the time wheel slot) and initiate performance of one or more events that are scheduled for execution at the current time (e.g., initiate execution of the delay event 112). After successfully triggering execution of the delay event 112, the driver module 116 is configured to remove the delay event 112 and its parameters from the time wheel 106, thus ensuring that the time wheel 106 does not include stale information (e.g., already executed delay events) as time advances.

The delay event system 104 additionally includes a consensus module 118, which is responsible for propagating the delay event 112, as inserted into the time wheel 106 by the hashing module 114, to each of a plurality of replica copies of the time wheel 106. For instance, in the illustrated example of FIG. 1, the time wheel 106 is depicted as having replica copies maintained at a plurality of nodes, such as node 120(1), node 120(2), and node 120 (*n*), where n represents any suitable integer greater than or equal to two. Each of the plurality of nodes contains a time wheel replica (e.g., node 120(1) stores time wheel replica 122(1); node 120(2) stores time wheel replica 122(2); and node 120 (*n*) stores time wheel replica 122 (*n*)). In some implementations, each time wheel replica 122 is stored in memory 124 of the corresponding node. Each time wheel replica 122 is representative of an identical copy of the time wheel 106, where each node 120 is communicatively coupled to the computing device 102 (e.g., via network 126). Although described and illustrated as a "node," each node 120 is representative of a different instance of a computing device 102, as described above. In this manner, each of the nodes 120 is configurable as a different computing device in a distributed computing system, as described in further detail below with respect to FIG. 7. The network 126 is representative of any suitable communication architecture configured to connect the computing device 102 to the nodes 120(1)-(*n*). For instance, the network 126 is representative of a local area network, a wide area network, and so forth.

The consensus module 118 ensures that updates made to the main copy of the time wheel 106 (e.g., the version of the time wheel maintained in memory 108 of the computing device 102) are propagated to each time wheel replica 122, such that all versions of the time wheel 106 include the same information regarding scheduled delay events. To do so, the consensus module 118 leverages a consensus protocol that is also implemented at each of the nodes 120(1)-(*n*). In response to detecting that the hashing module 114 has written the delay event 112 to the time wheel 106, the consensus module 118 propagates an event replica 128 to each of the nodes 120(1)-(*n*). The event replica 128 represents a copy of the delay event 112 and its associated parameters, such that each of the time wheel replicas 122 (1)-(*n*) includes information for the delay event 112. When propagating the event replica 128 to the time wheel replicas 122(1)-(*n*), the consensus module 118 tasks each of the nodes 120(1)-(*n*) with returning a commit message 130 to the delay event system 104. The commit message 130 is representative of a confirmation that the event replica 128 has been successfully propagated to (e.g., added to) a corresponding time wheel replica 122.

In implementations where a node 120 fails to return a commit message 130 within a threshold amount of time, the consensus module 118 is configured to automatically retry transmitting one or more event replicas 128 to the node 120. Alternatively or additionally, in implementations where a node 120 fails to return a commit message 130, the consensus module 118 is configured to remove the corresponding delay event 112 from the main copy of the time wheel 106, as well as any time wheel replicas 122 from which commit messages 130 were successfully received, thus ensuring that all versions of the time wheel 106 remain consistent with one another. In such a scenario where a delay event 112 is not successfully propagated to a threshold number of versions of the time wheel (e.g., all versions of the time wheel, at least 50% of the versions of the time wheel, or any suitable threshold amount/percentage of time wheel versions), the consensus module 118 is configured to notify a requesting entity (e.g., a computing device, process, or application from which the event schedule request 110 was received) that the delay event 112 failed to schedule properly and needs to be re-requested.

Via implementation of the consensus protocol at the delay event system 104 and each of the nodes 120(1)-(*n*), in the event of failure of the main copy of the time wheel maintained in memory 108 of the computing device 102, the consensus protocol elects one of the time wheel replicas 122 to serve as the new main copy of the time wheel. In this manner, the consensus module 118 represents functionality of the delay event system to ensure that the delay event 112 will be executed with precision (e.g., at one or more times when the delay event 112 is intended to occur and without delay). The driver module 116 of the computing device storing the main copy of the time wheel (e.g., the computing device 102 or one of the nodes 120) then executes the delay event 112 as event 132 in response to detecting that the time wheel 106 slot into which the delay event 112 was hashed corresponds to a "current pointer" (e.g., that a current time equals the time at which the delay event 112 was scheduled to occur).

Although described herein an illustrated in the context of a single time wheel 106, the described techniques are extendable to any number of time wheels. For instance, in the illustrated example of FIG. 1, different ones of the nodes 120(1)-(*n*) are configurable to each store a main copy of a different time wheel and task other entities in the system (e.g., the computing device 102 and different ones of the nodes 120) with storing replica copies of the respective time wheel main copy. As a specific example, if node 120(1) stores a main copy of a time wheel that is different from time wheel 106, node 120(2), node 120 (*n*), and the computing device 102 are each tasked with storing a replica copy of the time wheel with a main copy maintained by node 120(1). In such an implementation where a node stores a main copy of a time wheel (e.g., where node 120(1) stores a main copy of a time wheel), the node storing the main copy of the time wheel additionally implements the delay event system locally (e.g., at the node 120(1)) to perform the techniques described herein. In this manner, upon election of a replica copy stored at a node 120 as the new main copy of a time wheel, the node 120 storing the elected new main copy of the time wheel implements a local instance of the delay event system 104 to continue scheduling and execution of delay events as described herein. In this manner, the described systems and techniques are extendable to maintain any number of time wheels and replica copies thereof, where each time wheel is configurable to store information for any number of delay events that are to be output by any number of computing devices, applications, systems, services, and so forth. For additional details describing functionality of the delay event system 104, consider the following description.

In general, functionality, features, and concepts described in relation to the examples above and below are employable in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are configured to be applied together and/or combined in different ways. Thus, individual functionality, features, and concepts described in relation to different example environments, devices, components, figures, and procedures herein are useable in any suitable combinations and are not limited to the combinations represented by the enumerated examples in this description.

Delay Event Scheduling with Replicated Time Wheels

Figure 2:
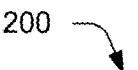
FIG. 2 depicts a system in an example implementation showing operation of the delay event system of FIG. 1 in greater detail.

FIG. 2 is an illustration of a digital medium environment 200 in an example implementation of the delay event system 104 receiving an event schedule request 110, scheduling a delay event at a main copy of a time wheel and replica copies thereof, and executing the delay event at an appropriate time by advancing the time wheel.

In the illustrated example of FIG. 2, the delay event system 104 receives an event schedule request 110 from a requesting source, such as from an application executing on the computing device 102. Upon receipt of the event schedule request 110, the hashing module 114 implements a hashing function 202 to generate a delay event 204 for the event schedule request and insert the delay event 204 into an appropriate location (e.g., an appropriate slot) of the time wheel 106, as maintained in memory 108 of the computing device implementing the delay event system 104. The hashing function 202 implemented by the hashing module 114 is representative of any suitable hashing algorithm, such as Message Digest Algorithm 5 (MD5), Secure Hash Algorithm 1 (SHA-1), Secure Hash Algorithm 256-bit (SHA-256), MurmurHash, and so forth.

For an example depicting a specific structure of the time wheel 106, and a corresponding region into which the delay event 204 is hashed in accordance with one or more implementations, consider FIG. 3.

FIG. 3 depicts an example 300 showing an example structure of a time wheel utilized by the delay event system 104. In accordance with the techniques described herein, the time wheel 106 is configurable in any suitable manner, such as a single ring of slots, as rings of slots arranged in multiple layers or levels with a hierarchical ordering, and so forth. In the illustrated example 300, view 302 depicts an example architecture of the time wheel 106 as including a plurality of regions stacked in multiple layers-specifically inner layer 304 and outer layer 306. The view 302 further depicts a current pointer 308, which is representative of an indicator used by the driver module 116 to reference which slot(s) of the time wheel 106 should be considered at a given point in time (e.g., at a current system clock tick of the computing device 102).

Arrow 310 is representative of an example direction by which the driver module 116 advances the time wheel 106 (e.g., by one slot every system clock tick, every second, etc.). In this manner, view 302 represents an instance where slot 312 is currently considered by the driver module 116 to determine whether any one or more delay events recorded in the slot 312 include parameters indicating that the delay event should be triggered for execution. Via advancement of the time wheel in the clockwise direction indicated by arrow 310, at a next instance in time (e.g., at a subsequent system clock tick), the driver module 116 evaluates slot 314 to determine whether any one or more delay events recorded in the slot 314 include parameters indicating that a delay event should be triggered for execution.

View 316 depicts a detailed view of the time wheel depicted at view 302, specifically focusing on two slots included in each of the two layers. For instance, view 316 depicts slot 312 and slot 314 of the inner layer 304 as well as slot 318 and slot 320 of the outer layer 306. In the illustrated example of FIG. 3, view 316 depicts the time wheel 106 configured as a two-layer time wheel where each layer includes 60 slots. In an example implementation where each slot corresponds to a different second in time, a full revolution of the time wheel occurs every minute. In this manner, slot 312 includes information for any delay events that are scheduled to occur at a current point in time. Similarly, slot 314 includes information for any delay events that are scheduled to occur one second in the future. Because time is infinite, creating a time wheel that includes slots for every future instance of time is impossible, much less practical to do so, regardless of medium (e.g., via computer, pen and paper, etc.).

Accordingly, the delay event system 104 is configured to generate a time wheel in a manner that permits scheduling delay events that are scheduled to occur during a future point in time that will not occur during a single rotation of the time wheel 106. For instance, in the illustrated view 316, slots of the outer layer 306 (e.g., slot 318 and slot 320) are representative of hierarchical data structures that store information for delay events that are scheduled to occur in the future beyond a complete revolution of the time wheel. Specifically, while slots of the inner layer 304 are able to accommodate delay events scheduled to occur within one revolution of the time wheel, slots of the outer layer 306 are each configured to store information describing delay events scheduled to occur during subsequent revolutions of the time wheel.

For instance, continuing the example configuration where the time wheel 106 includes 60 slots per layer, slot 318 is representative of information pertaining to delay events that are scheduled to occur during a second revolution of the time wheel (e.g., 60 to 119 seconds in the future relative to a current point in time). In a similar manner, slot 320 is configured to store information pertaining to delay events that are scheduled to occur during a third revolution of the time wheel (e.g., 120 to 179 seconds in the future relative to a current point in time). As described in further detail below, in response to advancing the time wheel, the driver module 116 is configured to flush executed delay events from the time wheel and recursively update a time associated with each time wheel slot (e.g., such that slots advanced past the current pointer 308 do not represent past points in time).

The hashing module 114 is further configured to reallocate delay events that were included in a time wheel slot but intentionally not executed. For instance, in an example scenario where slot 312 includes information for a delay event that is to be executed 60 seconds in the future, the hashing module 114 reallocates the delay event to an appropriate time wheel slot that will again be positioned relative to the current pointer 308 60 seconds in the future. The hashing module 114 is further configured to reallocate delay events (e.g., from the outer layer 306 to the inner layer 304) as part of recursively updating the time wheel slots upon each advancement of the time wheel.

To facilitate rapid and convenient analysis of delay events recorded in a given time wheel slot, multiple delay events recorded in a single time wheel slot are configured as a doubly linked list. For instance, list 322 depicts how delay events 324, 326, 328, 330, and 332 are each assigned to slot 312 and configured as a doubly linked list (e.g., indicated by the arrows connecting each delay event to adjacent delay events in the list 322). Via the doubly linked configuration, list 322 enables the driver module 116 to efficiently traverse a large number of delay events recorded in a given time wheel slot and identify whether individual ones of the how delay events 324, 326, 328, 330, and 332 are scheduled for current execution or should be reallocated to a different slot in the time wheel for subsequent execution at the appropriate time(s).

Returning to FIG. 2, after the hashing module 114 assigns the delay event 204 and its associated parameters 206 to an appropriate slot in the main copy of the time wheel 106, the hashing module 114 writes the delay event 204 and its associated parameters 206 to an event log 208 maintained at the delay event system 104. The event log 208 is read by the consensus module 118 to identify when an event replica 128 should be generated for the delay event 204 and propagated to each replica of the time wheel 106 (e.g., as represented by the time wheel replica 122 maintained in memory 124 of the node 120). Although depicted in the illustrated example of FIG. 2 as only being propagated to one time wheel replica 122, this single time wheel replica 122 is illustrated for the purpose of convenience and the consensus module 118 is configured to transmit an event replica 128 to any suitable number of replica nodes, as described above with respect to FIG. 1.

The consensus module 118 is depicted as implementing consensus protocol 210. The consensus protocol 210 is representative of any suitable protocol, such as the Paxos family of consensus protocols, the Raft consensus protocol, ZooKeeper Atomic Broadcast (Zab) protocol, the Multi-Paxos consensus protocol, the Viewstamped Replication protocol, Byzantine Fault Tolerance (BFT) protocols, combinations thereof, and so forth. In addition to tasking a replica node with returning a commit message 130 indicating confirmation of successfully recording the event replica 128 in the time wheel replica 122, the consensus protocol 210 represents functionality to elect one of the time wheel replicas 122(1)-(n) as the new main copy of the time wheel 106.

The driver module 116 is depicted as maintaining a current pointer 212 (e.g., the current pointer 308) for monitoring whether a current slot of the time wheel 106 includes a delay event scheduled for execution. Upon each suitable time duration (e.g., each second, each system clock tick, etc.), the driver module 116 is configured to advance 214 the time wheel 106. In some implementations, the advance 214 of the time wheel 106 refers to the repositioning of the current pointer 212 relative to the time wheel 106 rather than movement of the time wheel 106 itself. In response to detecting that the advance 214 of the time wheel 106 results in the current pointer 212 being positioned at a slot of the time wheel 106 into which the delay event 204 was hashed, the driver module 116 triggers execution of the event 132. Additionally, upon triggering execution of the event 132, the driver module 116 triggers an event flush 216. The event flush 216 causes information pertaining to the delay event 204 (and the event 132 that occurred as a result of executing the delay event 204 based on its parameters 206) to be removed from the main copy of the time wheel 106 as maintained in memory 108 as well as from each time wheel replica 122 maintained in memory 124 of the node 120. In this manner, the driver module 116 ensures precise execution of delay events and removal of stale delay event information from the time wheel 106 as well as its replica copies. In implementations, the event flush 216 is further representative of the driver module 116 recursively updating time associated with each time wheel slot, such that time wheel slots do not represent past points in time after the advance 214. In some implementations, the event flush 216 is further representative of one or more delay event reallocations among slots of the time wheel 106, such as moving delay events from the outer layer 306 to the inner layer 304.

Having considered example systems and techniques for recording and executing a delay event in a main copy of a time wheel as well as a plurality of replica copies of the time wheel, consider now example procedures to illustrate aspects of the techniques described herein.

Example Procedures

The following discussion describes techniques that are configured to be implemented utilizing the previously described systems and devices. Aspects of each of the procedures are configured for implementation in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3.

FIG. 4 depicts a procedure 400 in an example implementation in which a delay event system schedules a delay event at a main copy of a time wheel and at a plurality of replica copies of the time wheel.

A request to schedule an event to be triggered at a future time is received (block 402). The delay event system 104, for instance, receives event schedule request 110 from a source. In implementations, the source from which the event schedule request 110 is received is an application executing on a computing device implementing the delay event system 104 (e.g., computing device 102), a computing device other than the computing device 102, a notification server, or any other entity that is configured to request performance of a computational task in the future on behalf of one or more services or devices.

The event is placed into an appropriate slot of a main copy of a time wheel (block 404). The hashing module 114, for instance, generates a delay event 112 for the event schedule request 110 and places the delay event 112 into an appropriate slot of the time wheel 106, where the appropriate slot corresponds to a future point in time at which the delay event 112 is scheduled to be executed. The event is then propagated to each of a plurality of replica copies of the time wheel (block 406). The consensus module 118, for instance, transmits an event replica 128 to each of a plurality of time wheel replicas 122 of the time wheel 106, where each of the plurality of time wheel replicas 122 are maintained in respective memory 124 of a node 120 that is communicatively coupled to a computing device implementing the delay event system 104 (e.g., to computing device 102). The event replica 128 includes information that causes each time wheel replica 122 to record the delay event 112 and its associated parameters (e.g., parameters 206) in a same location of the time wheel replica 122 as placed into the time wheel 106 by the hashing module 114.

A determination is made as to whether a commit message has been received from each of the plurality of replica copies of the time wheel (block 408). The consensus module 118, for instance, implements a consensus protocol 210 to monitor whether each time wheel replica 122 returns a commit message 130 to the delay event system 104 indicating that the event replica 128 was successfully recorded in the time wheel replica 122. In response to determining that a commit message 130 is received from each time wheel replica 122 (e.g., a "Yes" determination at block 408), scheduling of the event is confirmed (block 410). The consensus module 118, for instance, informs the delay event system 104 that commit messages 130 were successfully received from each of the plurality of nodes 120 and permits the delay event 112 to remain scheduled in the time wheel 106.

Alternatively, in response to determining that not all of the plurality of replica copies of the time wheel have returned commit messages (e.g., a "No" determination at block 408), the consensus module 118 automatically retries propagating the event to a replica copy of the time wheel from which a commit message 130 was not received (block 412). Performance of the operations represented by block 412 are optional, as indicated by the dashed arrows proceeding to block 412 from block 408 and returning to block 408 from block 412. In implementations, an amount and/or frequency of automatic retries attempted by the consensus module 118 is dependent on parameters of the consensus protocol 210, based on parameters 206 of a delay event 204, or combinations thereof.

In response to automatically retrying to propagate the event to a replica copy of the time wheel a threshold number of times without receiving a commit message from the replica copy of the time wheel, an indication of a failure to schedule the event is output (block 414). The delay event system 104, for instance, outputs a message to a source from which the event schedule request 110 was received and informs the source that the delay event system was unable to successfully schedule the requested event. In some implementations, such a failure message includes instructions for the requesting source to resubmit the event schedule request 110.

Figure 5:
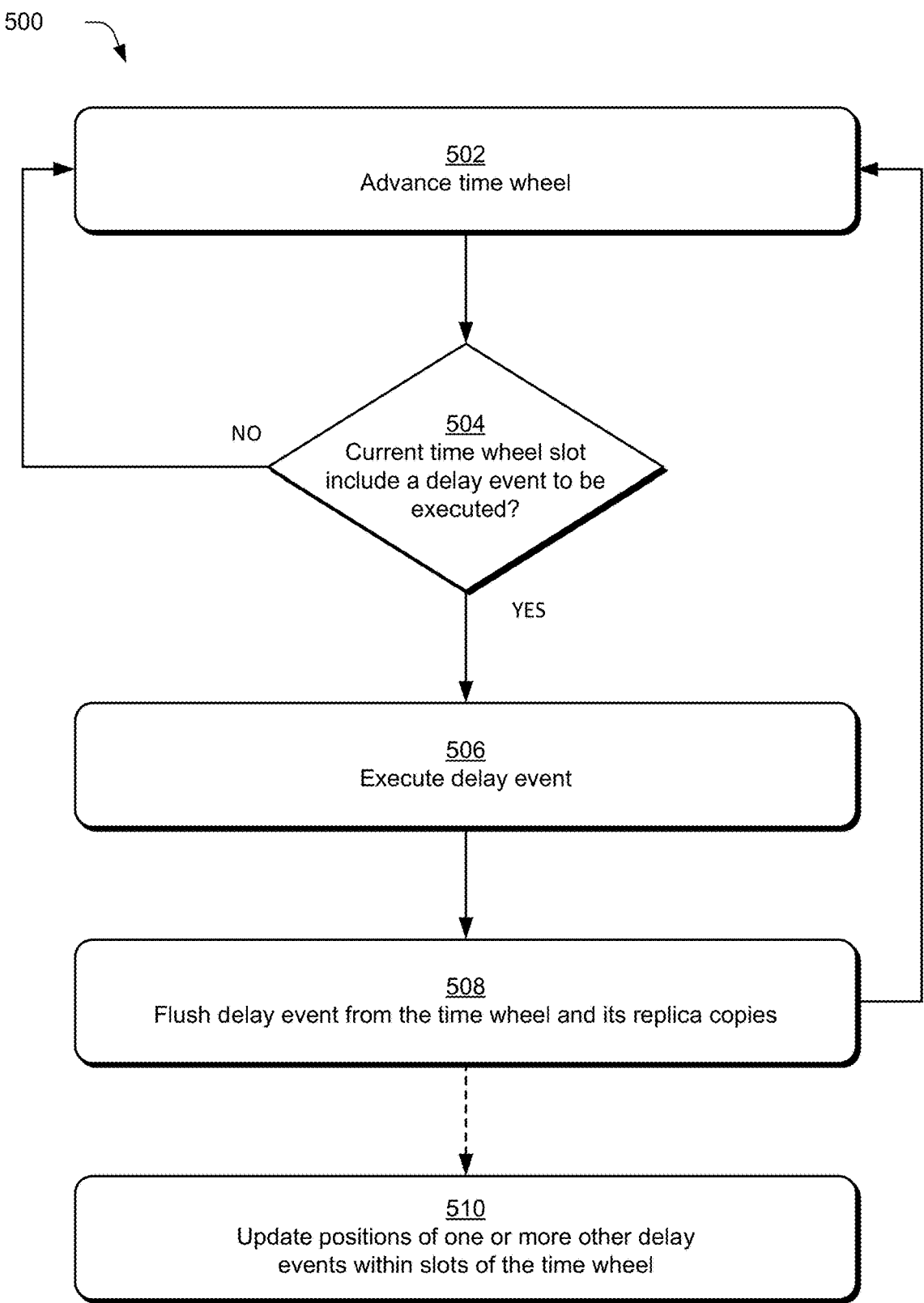
FIG. 5 is a flow diagram depicting a procedure in an example implementation in which a delay event system executes a delay event using a plurality of time wheel copies.

FIG. 5 depicts a procedure 500 in an example implementation in which a delay event system executes a delay event using a plurality of time wheel copies. To begin, a time wheel is advanced (block 502). The driver module 116, for instance, advances the time wheel 106 by a single slot at a cadence dictated by an architecture of the time wheel 106. As a specific example, in an implementation where the time wheel 106 includes slots that each represent a second in time, the driver module 116 advances the time wheel 106 once every second.

A determination is then made as to whether a current time wheel slot includes a delay event to be executed (block 504). The driver module 116, for instance, considers a slot of the time wheel 106 positioned relative to a current pointer (e.g., considers whether slot 312 relative to current pointer 308) includes one or more delay events scheduled to be executed at a current time. In response to determining that the time wheel slot does not include a delay event scheduled to be executed at a current time (e.g., a "No" determination at block 504), operation of the procedure 500 returns to block 502.

Alternatively, in response to determining that the time wheel slot includes a delay event scheduled for execution at the current time (e.g., a "Yes" determination at block 504), the scheduled delay event is executed (block 506). The delay event system 104, executes the scheduled delay event 112 as event 132. In one specific example, the delay event 112 is scheduled as a request to output an alarm at 6:16 PM and the event 132 comprises an alarm output at a corresponding device at 6:16 PM. Upon executing the delay event, the delay event is flushed from the time wheel as well as replica copies of the time wheel (block 508). The driver module 116, for instance, outputs an event flush 216 command to the time wheel 106 as well as each time wheel replica 122 thereof. Operation of the procedure 500 returns to block 502. In some implementations, operation of the procedure 500 further involves updating positions of one or more other delay events within slots of the time wheel (block 510). Performance of the operations represented by block 510 is optional, as indicated by the dashed arrow connecting block 508 to block 510. For instance, in some implementations where the time wheel 106 is configured as a hierarchical data structure such as the multi-layer time wheel depicted in FIG. 3, the hashing module 114 updates positions of delay events included in outer layers of the time wheel to inner layers of the time wheel and/or recursively updates time information associated with one or more slots of the time wheel.

FIG. 6 depicts a procedure 600 in an example implementation in which a delay event system elects a time wheel replica as a new main copy in response to detecting a failure of an original main copy of the time wheel.

To begin, a determination is made as to whether a main copy of a time wheel is down (block 602). The consensus protocol 210 implemented by the consensus module 118, for instance, is configured to monitor (e.g., constantly or at predefined intervals) a status of the main copy of the time wheel 106 as well as each time wheel replica 122 to determine whether the respective time wheel copy is useable by the delay event system 104. In response to determining that the main copy of the time wheel is active (e.g., a "No" determination at block 602), execution of delay events recorded in the time wheel are initiated using the main copy of the time wheel (block 604). The driver module 116, for instance, advances the time wheel 106 and initiates delay events recorded therein in accordance with the procedure 400 of FIG. 4.

Alternatively, in response to detecting that the main copy of the time wheel is down (e.g., a "Yes" determination at block 602), one of the plurality of replica copies is elected as a new main copy of the time wheel (block 606). The consensus protocol 210 implemented by the consensus module 118, for instance, elects one time wheel replica 122 to serve as the new main copy of the time wheel. After electing the new main copy of the time wheel, execution of the delay events recorded in the time wheel is initiated using the new main copy of the time wheel (block 608). The driver module

116, for instance, utilizes the elected time wheel replica 122 to perform the features described in accordance with the procedure 400 of FIG. 4.

Having described example procedures in accordance with one or more implementations, consider now an example system and device to implement the various techniques described herein.

Example System and Device

Figure 7:
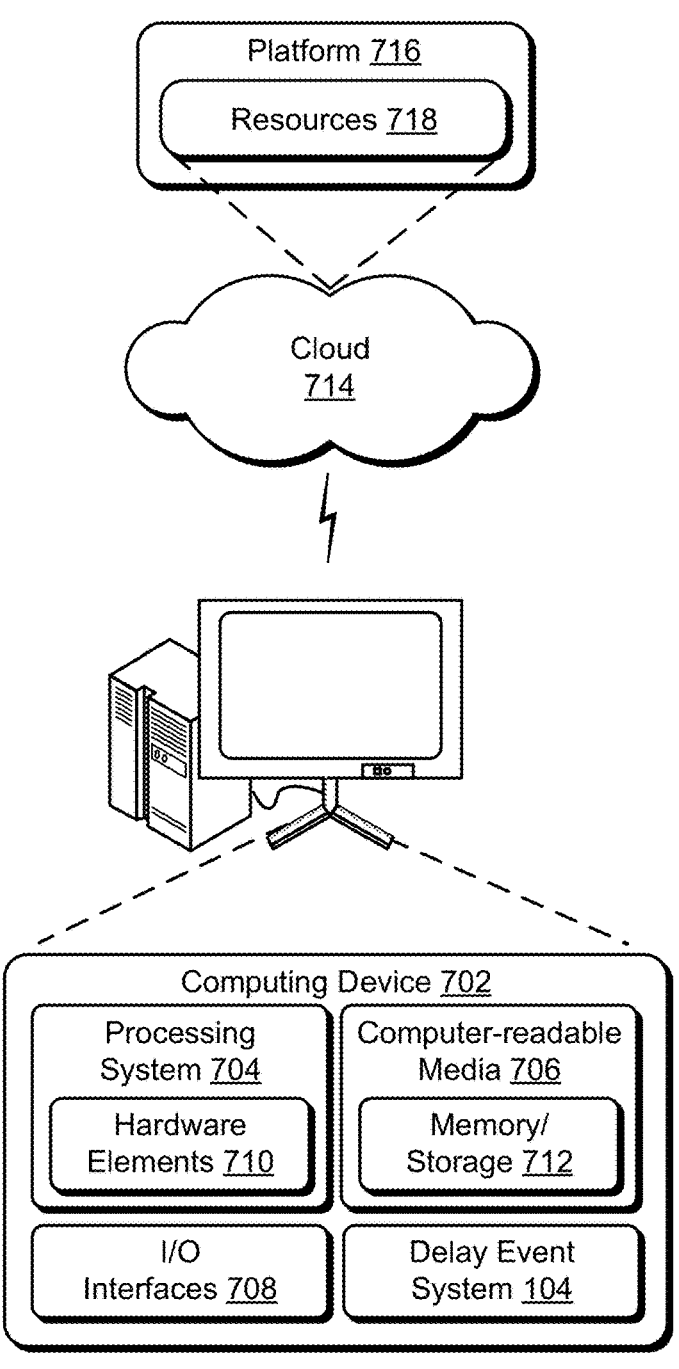
FIG. 7 illustrates an example system including various components of an example device to implement the techniques described with reference to FIGS. 1-6.

FIG. 7 illustrates an example system 700 that includes an example computing device 702, which is representative of one or more computing systems and/or devices that implement the various techniques described herein. This is illustrated through inclusion of the delay event system 104. The computing device 702 is configured, for example, as a service provider server, as a device associated with a client (e.g., a client device), as an on-chip system, and/or as any other suitable computing device or computing system.

The example computing device 702 as illustrated includes a processing system 704, one or more computer-readable media 706, and one or more I/O interface 708 that are communicatively coupled, one to another. Although not shown, the computing device 702 is further configured to include a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that are configurable as processors, functional blocks, and so forth. For instance, hardware element 710 is implemented in hardware as an application specific integrated circuit or other logic device formed using one or more semiconductors. The hardware elements 710 are not limited by the materials from which they are formed or the processing mechanisms employed therein. For example, processors are alternatively or additionally comprised of semiconductor(s) and/or transistors (e.g., electronic integrated circuits (ICs)). In such a context, processor-executable instructions are electronically executable instructions.

The computer-readable storage media 706 is illustrated as including memory/storage 712. The memory/storage 712 represents memory/storage capacity associated with one or more computer-readable media. The memory/storage 712 is representative of volatile media (such as random-access memory (RAM)) and/or nonvolatile media (such as read only memory (ROM), Flash memory, optical disks, magnetic disks, and so forth). The memory/storage 712 is configured to include fixed media (e.g., RAM, ROM, a fixed hard drive, and so on) as well as removable media (e.g., Flash memory, a removable hard drive, an optical disc, and so forth). In certain implementations, the computer-readable media 706 is configured in a variety of other ways as further described below.

Input/output interface(s) 708 are representative of functionality to allow a user to enter commands and information to computing device 702, and allow information to be presented to the user and/or other components or devices using various input/output devices. Examples of input devices include a keyboard, a cursor control device (e.g., a mouse), a microphone, a scanner, touch functionality (e.g., capacitive, or other sensors that are configured to detect physical touch), a camera (e.g., a device configured to employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is representative of a variety of hardware configurations as further described below to support user interaction.

Various techniques are described herein in the general context of software, hardware elements, or program modules. Generally, such modules include routines, programs, objects, elements, components, data structures, and so forth that perform particular tasks or implement particular data types. The terms "module," "functionality," and "component" as used herein generally represent software, firmware, hardware, or a combination thereof. The features of the techniques described herein are platform-independent, meaning that the techniques are configured for implementation on a variety of commercial computing platforms having a variety of processors.

An implementation of the described modules and techniques are stored on or transmitted across some form of computer-readable media. The computer-readable media include a variety of media that is accessible by the computing device 702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information for access by a computer.

"Computer-readable signal media" refers to a signal-bearing medium that is configured to transmit instructions to the hardware of the computing device 702, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that is employed in some embodiments to implement at least some aspects of the techniques described herein, such as to perform one or more instructions. Hardware, in certain implementations, includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are employed to implement various techniques described herein. Accordingly, software, hardware, or executable modules are implemented as one or more instructions and/or logic embodied on some form of computer-readable storage media and/or by one or more hardware elements 710. The computing device 702 is configured to implement instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing system 704. The instructions and/or functions are executable/operable by one or more articles of manufacture (for example, one or more computing devices 702 and/or processing systems 704) to implement techniques, modules, and examples described herein.

The techniques described herein are supported by various configurations of the computing device 702 and are not limited to the specific examples of the techniques described herein. This functionality is further configured to be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 include applications and/or data that is utilized while computer processing is executed on servers that are remote from the computing device 702. Resources 718 also include services provided over the Internet and/or through a subscriber network, such as a cellular or Wi-Fi network.

The platform 716 is configured to abstract resources and functions to connect the computing device 702 with other computing devices. The platform 716 is further configured to abstract scaling of resources to provide a corresponding level of scale to encountered demand for the resources 718 that are implemented via the platform 716. Accordingly, in an interconnected device embodiment, implementation of functionality described herein is configured for distribution throughout the system 700. For example, in some configurations the functionality is implemented in part on the computing device 702 as well as via the platform 716 that abstracts the functionality of the cloud 714.

CONCLUSION

Although the invention has been described in language specific to structural features and/or methodological acts, the invention defined in the appended claims is not necessarily limited to the specific features or acts described. Rather, the specific features and acts are disclosed as example forms of implementing the claimed invention.

What is claimed is:

1. A method comprising:

maintaining a main copy of a time wheel data structure in memory of a first node, the time wheel data structure comprising a plurality of slots that each correspond to a different system clock cycle and comprise one or more events to be triggered at a corresponding system clock cycle;

maintaining a plurality of replica copies of the time wheel data structure in memory of a plurality of nodes that are each different than the first node;

receiving a request to schedule an event to be triggered at a future time;

issuing an update to the main copy of the time wheel data structure to comprise the event in one of the plurality of slots that corresponds to a system clock cycle occurring at the future time;

propagating the update to a subset of the plurality of replica copies;

advancing the main copy of the time wheel data structure and each of the plurality of replica copies by one slot each system clock cycle; and triggering the event from the main copy of the time wheel data structure at the future time.

2. The method of claim 1, wherein propagating the update to the subset of the plurality of replica copies of the time wheel data structure comprises tasking the subset of the plurality of replica copies of the time wheel data structure with returning a message confirming that the update has been replicated.

3. The method of claim 2, further comprising automatically retrying propagating the update to one of the subset of the plurality of replica copies in response to detecting that the message confirming that the update has been replicated has not been received from the one of the subset of the plurality of replica copies for a threshold duration.

4. The method of claim 2, further comprising transmitting a notification, to a source from which the request was received, indicating a failure to schedule the event to be triggered at the future time in response to a threshold number of the plurality of nodes maintaining the subset of the plurality of replica copies failing to return the message confirming that the update has been replicated.

5. The method of claim 1, wherein propagating the update to the subset of the plurality of replica copies is performed using a consensus protocol.

6. The method of claim 1, wherein issuing the update to the main copy of the time wheel data structure comprises hashing the event into one of the plurality of slots at a position that defines a number of times the system clock cycle will occur before the future time at which the event is to be triggered.

7. The method of claim 1, wherein advancing the main copy of the time wheel data structure comprises advancing a current time pointer relative to the plurality of slots and recursively updating a time associated with each of the plurality of slots.

8. The method of claim 1, wherein advancing the main copy of the time wheel data structure comprises advancing a current time pointer relative to the plurality of slots and scanning a corresponding one of the plurality of slots that is positioned at the current time pointer, the method further comprising triggering execution of a plurality of events responsive to identifying that the corresponding one of the plurality of slots specifies that the plurality of events are to be executed simultaneously.

9. The method of claim 8, wherein at least two of the plurality of events are associated with different computational tasks or applications.

10. The method of claim 1, further comprising removing the event from the time wheel data structure responsive to triggering the event.

11. The method of claim 1, further comprising removing the event from each of the plurality of replica copies in response to triggering the event.

12. The method of claim 1, wherein a number of the plurality of replica copies of the time wheel data structure is defined by a replica factor that is determined based on an amount of delay events maintained in the main copy of the time wheel data structure and computational resources associated with one or more of the first node of the plurality of nodes.

13. The method of claim 1, wherein issuing the update to the main copy of the time wheel data structure comprises specifying a number of times the one of the plurality of slots is to pass a current pointer before triggering the event.

14. The method of claim 1, wherein at least one of the plurality of slots of the time wheel data structure comprises a plurality of delay events scheduled for future execution.

15. The method of claim 14, wherein the plurality of delay events is maintained as a doubly linked list in the one of the plurality of slots of the time wheel data structure.

16. A method comprising:

receiving a request to schedule an event to be triggered at a future time;

updating a main copy of a time wheel maintained in memory of a computing device to comprise information describing the event and at least one operation to be performed as part of triggering the event at the future time;

transmitting an update to a subset of a plurality of replica copies of the time wheel that are each maintained in memory of a different computing device; and responsive to receiving a commit message from the subset of the plurality of replica copies of the time wheel indicating that the update was successfully recorded in the replica copy of the time wheel, maintaining the information describing the event and the at least one operation to be performed as part of triggering the event at the future time; or responsive to not receiving the commit message from the subset of the plurality of replica copies of the time wheel, removing the information describing the event and the at least one operation to be performed as part of triggering the event at the future time and transmitting a failure message to a source from which the request to schedule the event was received.

17. The method of claim 16, wherein responsive to not receiving the commit message from the subset of the plurality of replica copies of the time wheel, the method further comprises automatically propagating the information describing the event and the at least one operation to be performed as part of triggering the event at the future time a threshold number of times before transmitting the failure message to the source.

18. The method of claim 16, wherein updating the main copy of the time wheel to comprise the information describing the event and the at least one operation to be performed as part of triggering the event comprises hashing the event into one of a plurality of slots of the time wheel based on a number of times the time wheel will be advanced before the future time.

19. The method of claim 16, further comprising advancing the main copy of the time wheel and the subset of the plurality of replica copies of the time wheel and triggering the event in response to detecting that a current pointer is positioned relative to a slot in the main copy of the time wheel at which the information describing the event is recorded.

20. A system comprising:

one or more processors; and a computer-readable storage medium storing instructions that are executable by the one or more processors to perform operations comprising:

maintaining a main copy of a time wheel in memory of a first computing device, the time wheel comprising a plurality of slots that each correspond to a different point in time and comprise information for at least one event to occur at a corresponding point in time;

maintaining a plurality of replica copies of the time wheel in memory of a plurality of computing devices that are each different than the first computing device;

receiving a request to schedule an event to be triggered at a future time;

issuing an update to the main copy of the time wheel to comprise the event in one of the plurality of slots that corresponds to a system clock cycle occurring at the future time;

propagating the update to a subset of the plurality of replica copies;

advancing the main copy of the time wheel and each of the plurality of replica copies of the time wheel by one slot each system clock cycle; and triggering execution of the event from the main copy of the time wheel at the future time at least one event in response to detecting that one of the plurality of slots corresponding to a current time comprises the at least one event.

\* \* \* \* \*